United States Patent [19]

Piotrowski et al.

[11] Patent Number: 4,611,934
[45] Date of Patent: Sep. 16, 1986

[54] DEVICE FOR PRELOADING BEARINGS

[75] Inventors: Tadeusz W. Piotrowski; Horst E. Maack, both of Cincinnati, Ohio

[73] Assignee: Cincinnati Milacron Inc., Cincinnati, Ohio

[21] Appl. No.: 773,753

[22] Filed: Sep. 9, 1985

[51] Int. Cl.[4] .................. F16C 23/06; F16C 25/06; F16C 43/04

[52] U.S. Cl. .................. 384/517; 384/519; 384/556

[58] Field of Search .............. 384/517, 518, 519, 556, 384/563, 493, 510

[56] References Cited

U.S. PATENT DOCUMENTS

| | | | |
|---|---|---|---|
| 3,222,991 | 12/1965 | Bone | 409/231 |
| 3,307,890 | 3/1967 | Johansson | 384/517 |
| 3,313,581 | 4/1967 | Kusakabe | 384/517 |
| 3,352,611 | 11/1967 | Seidel | 384/461 |
| 3,664,718 | 5/1972 | Uhtenwoldt | 384/101 |
| 3,804,477 | 4/1974 | Allmandinger et al. | 384/447 |
| 3,945,694 | 3/1976 | Vaillette | 384/517 X |
| 4,211,454 | 7/1980 | Mitchell et al. | 384/517 |
| 4,226,485 | 10/1980 | Pruvot | 384/563 X |
| 4,400,098 | 8/1983 | Lacey et al. | 384/517 X |
| 4,551,032 | 11/1985 | Mottershead | 384/517 |

FOREIGN PATENT DOCUMENTS 589862 12/1959 Canada .................. 384/517

Primary Examiner—Stuart S. Levy
Assistant Examiner—Thomas R. Hannon
Attorney, Agent, or Firm—Thomas M. Farrell

[57] ABSTRACT

A spindle is rotatably mounted within a housing on spaced-apart antifriction bearings. The inner races of the bearings are held solidly against shoulder portions of the spindle and the outer race of the front bearing is mounted against a shoulder in the housing. The outer race of the rear bearing is supported in a circular diaphragm concentric with the spindle axis, which may be flexed along the axis to load the bearings against one another. A hydraulic chamber is formed against the diaphragm to load the diaphragm at preselected intervals, and a stop plate is provided in the housing to limit movement of the outer race is a distance corresponding to a maximum preload in the bearings. When the stop plate is contacted, hydraulic pressure may be greatly increased to further load the diaphragm and its corresponding outer race solidly against the stop plate without further increasing the preload in the bearing set, providing a high holding force resistant to spindle pull out.

8 Claims, 6 Drawing Figures

DEVICE FOR PRELOADING BEARINGS

BACKGROUND OF THE INVENTION

The invention relates generally to devices for maintaining preload in spaced-apart antifriction bearings, commonly applied to machine tool spindles.

In particular, the invention specifically relates to those spindle bearing preload devices which are adjustable in use, so that the bearing preload level may be varied.

It is commonly known in the machine art to preload the inner and outer races of antifriction bearings against one another to remove the "shake" or clearances, from a set of bearings and to induce a desired amount of strain into machine elements, for example, a tool spindle, so that machining force levels will not overcome the preload and thus cause the shake to be seen as spindle movement. Additionally, a certain amount of strain is often put into the machine tool spindle so that thermal growth may also be accommodated without loosening the bearing sets.

A high level of preload is useful for maintaining spindle stability during cutting operations, but it is also desirable that the preload amount be matched to the cutting forces seen by the spindle. For example, at high rotational spindle speeds, light cutting forces are generally encountered, while at the low end of the spindle rotational speeds, heavy cutting forces are generally seen. Since the preload amount directly influences the torque on a bearing set, it can be seen that unnecessarily large preload forces can cause high torques which, in the case of high rotational speeds, consume a large quantity of horse power. Such high horse power running conditions cause excessive heat buildup and contribute to early failure of the bearings.

Thus, it has been recognized by prior art practitioners that it is desirable to have a spindle bearing preload device which can be varied as to the amount of preload to accommodate higher and lower rotational speeds satisfactorily, at low running temperatures.

Several interesting and pertinent prior art patents discuss the problem and present solutions therefor, to wit: U.S. Pat. Nos. 3,222,991, Dec. 14, 1965; 3,352,611, Nov. 14, 1967; 3,664,718, May 23, 1972; 3,804,477, April 16, 1974; 3,945,694, Mar. 23, 1976; and 4,226,485, Oct. 7, 1980.

Most bearing preload devices act in a similar fashion: front (nearest the spindle nose) and rear spaced-apart antifriction bearings are mounted with their inner races secured to the spindle while the outer race of the front bearing is positioned against a solid housing shoulder and the corresponding outer race of the rear bearing is loaded by mechanical or fluid springs to induce a strain in the spindle as the antifriction elements transmit the preload to the spindle. In this common application, the rear bearing outer race must be slidable in its bore, necessitating radial clearance which, in turn, may contribute to radial vibration or radial loss of precision in the spindle mounting arrangement. In the usual fixed preload system, i.e. where preset mechanical springs thrust the rear bearing outer race in a rearward direction, spindle growth due to thermal excursions may be accommodated while maintaining preload. In these prior art assemblies, machine cutting forces directed toward the spindle nose are borne solidly by the shouldered outer race of the front bearing. However, when the spindle of the machine experiences forces which tend to pull the spindle out of the housing, i.e. in a forward direction, the outer race of the rear bearing sees the pulling load and can resist movement only up to the limit of the spring preload. After this point, some spindle movement may be seen in a forward direction as pulling forces increase.

Applicant has determined that, in an ideal bearing preload device involving spaced-apart antifriction bearings on a spindle, the front bearing outer race should be rigidly backed up by a housing shoulder as with prior art, and that the outer race of the rear bearing should be provided with a means for varying the axial load on the bearing in a uniform fashion. But further, the outer race should be easily movable when increasing or decreasing the preload amount, and yet the assembled device should be free of clearances which may contribute to radial shake of the bearing and a consequent disturbance of the set-up. Additionally, the device should be easily settable throughout a preload range and yet should be resistant to pullout forces exerted against the device, certainly to the extent of loads which exceed the preload amount.

The patented preload devices enumerated above merit discussion:

U.S. Pat. No. 3,222,991 teaches a mechanism for adjustably preloading a rear bearing set for a machine spindle wherein a plurality of pistons mounted in a loading ring directed against the outer race of the rear bearing set serves to provide a variable rearward thrust as hydraulic pressure is varied to the pistons. The loading ring or plunger carries the pistons, and is integrally formed with a sliding member which carries the outer races of the preloadable bearing set. The plunger slides in a cylinder bore having clearance provided therefor, and the plunger has an integral, thin walled annular chamber into which hydraulic fluid may be introduced. When fluid pressure is introduced into the chamber, the chamber expands thereby locking or tending to seize the piston by friction through radial forces applied to the cylinder wall. The radial forces of the expandable chamber create a normal force on the cylinder wall and the resultant axial frictional force serves to resist pullout of the spindle when pulling forces are exerted against the spindle in a "forward" direction. An alternate embodiment of the invention shows that the individual radial array of pistons may be replaced with one central piston coaxial with the spindle axis.

Several difficulties are encountered in the design depicted, for example: plural hydraulic lines must be utilized, i.e. one to supply desired preload pressure to the loading pistons and a second, very high pressure, line must be directed into the annular expansive cavity of the loading plunger. Only a fraction (friction coefficient) of the large radial force is useable to resist spindle pullout. Additionally, radial clearance around the sliding plunger in the cylinder may possibly cause a disturbance in the radial position of the rear bearing set. Since it is preferred to have the stiffest radial mounting possible, together with a stiff axial mount, the assembly presents a hydraulic spring, in effect, for taking up the radial clearance after the plunger is moved. Further, the hydraulic clamp affected by the high pressure line must be relieved when it is desired to change the preload through the lower pressure line.

U.S. Pat. No. 3,352,611 illustrates a spindle bearing preload device wherein the rear set of spindle bearings are thrust rearwardly by mechanical springs loaded against an outer race carrier. The outer race carrier is mounted in a linear ball bushing, so that it may be easily moved in an axial direction. The maximum amount of preload is determined by the spring compression, and the spring force may be overcome by a plurality of fly balls carried at the rear end of the spindle and designed to fly away under centrifugal force. The radial fly away force is directed against a ramp surface on the outer race carrier and is thus transmitted as an axial force which may overcome the spring preload force. Thus, at high speeds, the preload is lessened on the bearings.

The basic mechanism shown has its maximum preload derived from a compressed plurality of axial springs arrayed around the spindle. The fly balls rely on frictional drive to be revved up to proper speed to produce the radial load needed to transform into the axial unloading force. Further, a linear ball bushing of the type shown, i.e. nonrecirculating bearings, requires a close fit between the inner member and outer member bearing on the balls, so that the balls will roll relative to the two. However, in actual practice, it is difficult to maintain parallelism of the inner surface and outer surface which contact the balls, and the balls and ball cage generally tend to creep or walk to one end of the assembly. In such event, the antifriction linear motion would be negated by skidding of the balls.

U.S. Pat. No. 3,664,718 teaches a rear bearing set preload device utilizing a sleeve for carrying the outer races of the rear bearing set. The sleeve has a circular piston face so that variable pressure may be applied to the face to change the preload. The device also teaches that the sleeve is supported in a plurality of hydrostatic pockets so that it may freely move in an axial direction. The device has no locking means for maintaining the preload, and thus the piston and variable hydraulic force create a fluid spring against which any pull-out forces react.

U.S. Pat. No. 3,804,477 illustrates a device for relieving a maximum set-in preload which clamps a pair of spaced-apart bearings together. A thrust face of a nut member is directed against a bearing inner race while the outer races are held to a preset spaced-apart dimension, and the nut member has a diaphragm at its thrust end. A plurality of weights are attached to the diaphragm at an inner chamber formed within the nut clamping member and, at high rotational speeds, the weights will tend to fly away centrifugally and slightly curl the diaphragm backward away from the preloading thrust face of the inner race.

The device requires the use of a very complex nut member which is machined out and, presumably, welded together so that the hollow face of the disc-shaped element is covered with a diaphragm surface. The diaphragm has a plurality of weights affixed around its inner bore and the preload cannot be varied at will during operation. The set preload may be lessened only at different speeds, and only in accordance with the centrifugal forces generated therein. Thus, the preload cannot be tweaked for accommodation of expected cutting forces.

Additionally, the mechanism loads the rear bearing with a mechanical diaphragm spring without a lock or stop, so that any pull out forces on the spindle will pull directly against the mechanical spring force of the preload device.

U.S. Pat. No. 3,945,694 illustrates a spindle preload device wherein the rear outer race carrier of a spindle bearing set is thrust rearwardly by a plurality of mechanical springs which may accommodate thermal expansion and contraction of the spindle. Additionally, the device teaches that the rear bearing race carrier has rows of barrel-shaped rollers, located in a suitable bore, to provide an antifriction rolling assembly so that sliding forces are minimized.

The device is generally complex in that the barrel rollers must be well matched to take up any radial shake or clearance which may exist in the assembly. Further, the maximum force is induced by a plurality of compression springs located in a circular array around the spindle and directed at the thrust face at the rear of the outer race bearing carrier. Thus, the preload in the assembly cannot be varied to suit the loads, but merely the spindle growth is accommodated. Incidentally, spindle growth will cause an increase in the working height of the compression springs, which lessens the spring load. Any pull out forces encountered by the spindle are taken directly against the preload springs at the rear of the spindle.

U.S. Pat. No. 4,226,485 teaches a bearing assembly which embodies certain thermal adapters and teaches thermal philosophies involved for compensating for spindle growth and radial growth of bearing elements. The general idea is to match the bearing elements such as rollers and inner and outer races and controlling the welled-up heat by specially designed thermal barriers at the rear and front bearings so that the bearing elements may not separate and "shake" may not occur. Of interest in the subject patent is the fact that FIG. 1 shows the rear bearing of the assembly mounted in a single diaphragm ring, and FIG. 6 of the assembly shows the rear bearing mounted in a pair of diaphragm rings and having axial loads applied to the outer race by a circular array of axial pistons. While not depicted in the drawings, the specification also relates that the circular array of pistons may be substituted for by a single annular piston centered on the spindle axis.

No locking mechanism is shown in the reference patent, and any pull out loads would be directed against the hydraulic piston or pistons which effectively create a hydraulic spring. Thus, when the spring force is exceeded, the spindle may move forward under a pull out load. Additionally, it should be noted that the assembly teaches that the screws for clamping the rear spindle bearing cover to the housing pass through clearance holes machined through the bearing support diaphragm in both FIGS. 1 and 6. It is evident from good design practice, that a circular pattern of holes through a diaphragm which is expected to flex will tend to create stress risers where failure or crack propagation may occur.

Applicants have obviated the difficulties inherent in the prior art devices by providing a unique spindle bearing preload device which employs an axially-flexible yet radially-stiff element—for example, a circular diaphragm, supporting the rear bearing of an assembly, wherein loading of the diaphragm and subsequent movement of the outer race of the rear bearing will not disturb the centrality of the outer race relative to the spindle axis, since sliding elements or rollers are not used. Additionally, selectively varied hydraulic pressure is directed against the diaphragm face to provide a large operating piston which is concentric with the spindle axis. Still further, applicant's invention has provided for a positive stop face in line with the axially-powered diaphragm support so that at a predetermined movement of the outer race corresponding to a predetermined maximum strain or preload in the spindle, the stop face will be encountered and, at such time, the hydraulic pressure may be raised to such level that an extremely large holding force will result in the set-up without further increase in the preload of the bearing sets. In this manner, therefore, at the most desired time, i.e. at low speeds and relatively high preloads, the holding force may be raised to sufficiently high level to resist any expected pull out, or oppositely-directly force, on the spindle, while the spindle bearings do not suffer the effects of having to run with abnormally high preload force.

SUMMARY OF THE INVENTION

The invention is shown embodied in a machine tool having a housing carrying a spindle which is rotatable about a spindle axis of rotation. A first antifriction bearing is fixed in the housing in a suitable bore and a bearing support, such as a diaphragm, flexible along the spindle axis, is affixed at its outer periphery to the housing at a point spaced from the first bearing along said axis. A second antifriction bearing is mounted to the inner periphery of the diaphragm, coaxial with the first bearing, and the spindle is rotatably mounted in both the first and second bearings. The bearings are preset through proper dimensioning of the elements to a predetermined spaced apart distance for preloading the antifriction elements of the bearings to an initial value. The housing embodies a stop means for limiting axial travel of the second bearing, and means such as hydraulic pressure is provided for next flexing the diaphragm along its axis to load the diaphragm and bearing against said stop means to preload the bearings according to their spacing, while creating a high holding force for resisting spindle pullout without further affecting the preload of the bearings against one another. The stop means also serves to maintain squareness of the preloaded bearings with the spindle axis to thereby resist overturning moments on the spindle.

DESCRIPTION OF THE PREFERRED EMBODIMENT

Figure 1:
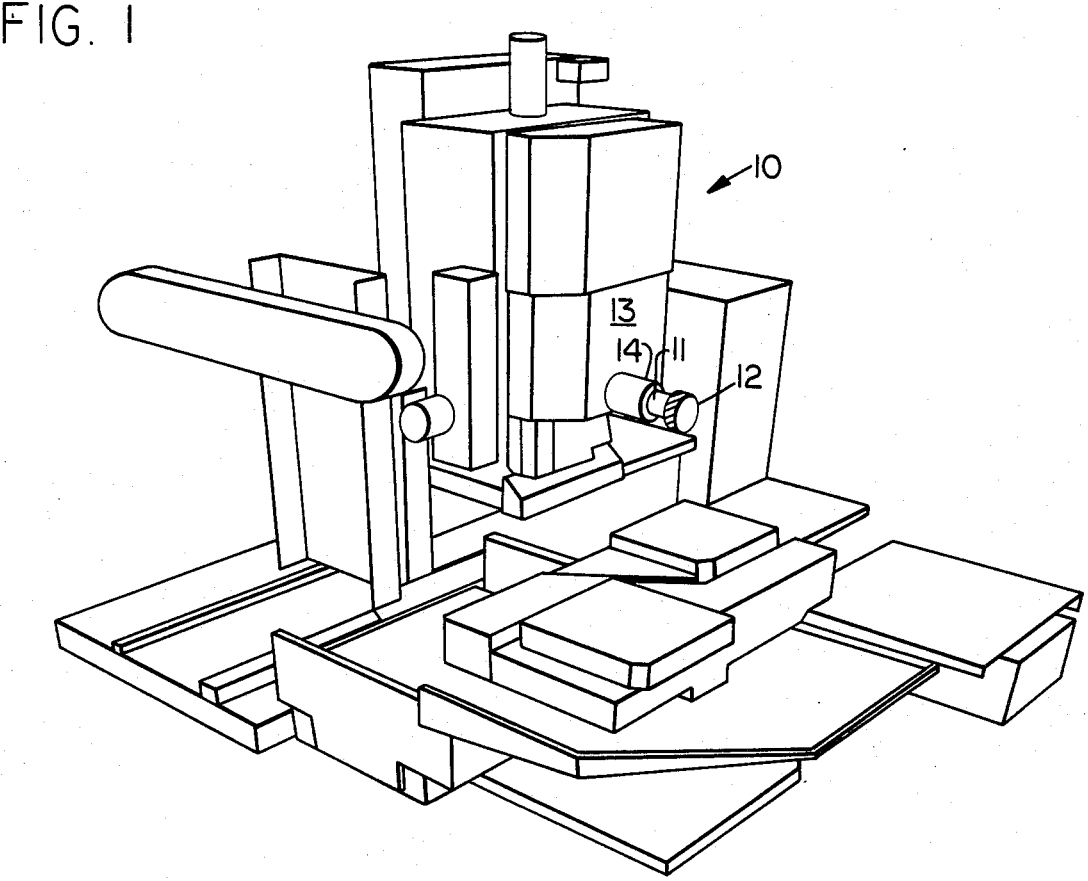
FIG. 1 is a perspective view of a machine tool embodying the spindle preload device of the present invention.

FIG. 1 of the drawings illustrates a machining center 10 of the type manufactured by Cincinnati Milacron Inc., the assignee of the present invention. The machining center 10 has a rotatable spindle 11 for carrying metalcutting tools 12 and the like, and the spindle 11 is supported, in part, in a movable spindle carrier 13 having a housing extension 14.

Figure 2:
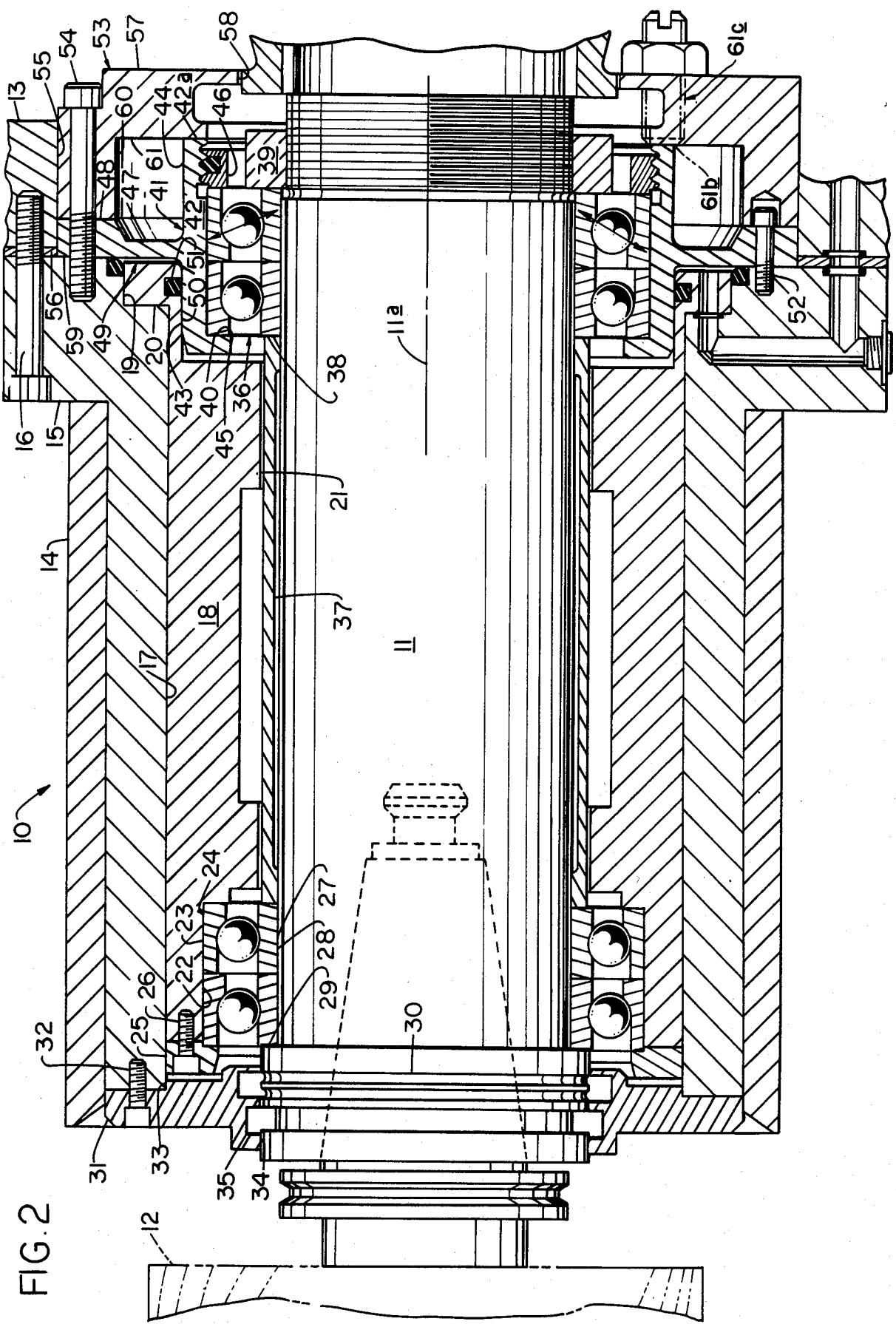
FIG. 2 is an axial section taken through the spindle of the machine tool of FIG. 1.

FIG. 2 is a side elevational section taken through the spindle 11 and housing extension 14 of FIG. 1, wherein the housing extension 14 is seen to be a generally tubular member having a flange 15 for bolting the extension 14 to the spindle carrier 13, and a plurality of cap screws 16 are provided for fastening the two 13,14 together. The housing extension 14 has a central bore 17 which supports a mounting tube 18. The mounting tube 18 extends from the rear of the housing extension 14 and terminates shortly before the front end of the extension 14. The rear of the extension bore 17 has a counterbore 19 to receive the enlarged flange 20 of the mounting tube 18. The flange 20 is bolted to the extension 14 to secure the assembly. The mounting tube 18 has a clearance hole 21 machined through its center, and a front bearing counterbore 22 is provided in the tube 18 to receive back-to-back outer races 23 of a pair of angular contact ball bearings 24. Here it should be noted that a variety of antifriction bearings may be used in various numbers and combinations, at the selection of the designer. The front of the extension bore 17 receives a bearing locking cap 25 which is fitted against the outer end of the bearing outer race 23 and, in turn, is secured to the mounting tube 18 by a plurality of cap screws 26. The rotatable machine tool spindle 11 is received through the bore 27 of the inner races 28 of the front bearing set 24, and the spindle 11 has a front shoulder 29 and seal grooves 30 provided in the shoulder diameter to sling water and oil. The front of the housing extension 14 receives a front seal cap 31, bolted by cap screws 32 and guided by a pilot 33 received in the bore 17. The inner bore 34 of the seal cap 31 fits closely to the shoulder 29 of the spindle 11, and labyrinth slinger grooves 35 are provided inside bore 34.

The tool spindle 11 supports and drives the cutting tool 12. The spindle 11 extends rearwardly through a rear set of bearings 36 spaced apart from the first set of bearings 24, by a spacer tube 37 slidably received on the spindle 11. The inner races 28,38 of the bearings 24,36 are all locked together by a locknut 39 threadably received on the spindle 11 at the rear of the second set of bearings 36. The outer races 40 of the rear set of bearings 36 are carried in a movable bearing support, such as the diaphragm 41, having an integral circular body 42 comprising front and rear hubs 43,44 bored to receive the outer races 40 against a front shoulder 45, and having an internal locknut 46 threadably received within the body 42 to secure the races 40. The outer race 42a of the body 42 is held square with the axis 11a of the spindle 11. The body 42 has a radially-extending, disc-shaped central web 47, and the thinned out web 47 enlarges to a relatively thicker clamping rim 48 around the outer part of the diaphragm 41.

The flange 20 of the mounting tube 18 is recessed so that a small, expansible, chamber 49 is formed between the flange 20 of and the front face of the web 47. The front hub 43 is slidably received in a close-fitting counterbore 50 in the mounting tube 18, and a seal 51 is provided. A plurality of cap screws 52 are received around the rim 48 in a circular bolt pattern to secure the rim 48 to the flange 15 of the housing extension 14.

A stop plate 53 is mounted to the rim 48 and has an equal outer diameter. A plurality of cap screws 54 are received through the stop plate 53, diaphragm 41, and housing extension 14, in a circular bolt pattern to secure the elements together in subassembly. The outer diameters of the stop plate 53 and rim 48 are received in a close-fitting bore 55 in the spindle carrier 13 to pilot the subassembly at final assembly time. A fitting washer 56 is received between the housing extension 14 and the spindle carrier 13 for accurately assembling the extension 14 and its associated components. The stop plate 53 has a rear face 57 which extends radially from an outer diameter to the clearance bore 58 provided therethrough, and the front face 59 is provided with a deep counterbore 60 of a diameter approximating the start of the web 47 of the diaphragm 41. The counterbore 60 extends to an interior surface 61, which is parallel to the rear face 57 of the stop plate 53 and square with the spindle axis 11a, and the surface 61 is dimensioned to be approximately 0.001 inch away from the initial assembly of the end of the diaphragm hub 44. Interdrilling is provided through the spindle carrier 13 and flange 15 of the housing extension 14, as well as the flange 20 of the mounting tube 18, so that pressurized fluid may be ported from a suitable source of pressure (not shown) to the chamber 49 formed at the front face of the diaphragm web 47. Here it should be noted that the diaphragm web 47 is thinned out and made of sufficient spring material so that it may be deflected in a direction along the spindle axis 11a, while yet maintaining stiff radial control of the bearings 36. In initial assembly, the spacer tube 37 is dimensioned so that a slight strain or light initial preload is placed on the bearings 24,36 and the reaction loads are seen in the direction of the double-ended arrows extending through the antifriction elements of the bearings 36.

It can be seen that the spindle 11 may grow in a rearward direction due to thermal effects, and growth will be accommodated by the axially flexed diaphragm 41.

At predetermined times, the light preload may be augmented by an additional load as cutting loads are experienced by the spindle 11 and tool 12. These relatively light cutting loads, effected by light pressure in the chamber 49, will occur at relatively high rotational speeds of the spindle 11, and thus will not cause excessive heat generation or deleterious effects to occur in the bearings 24,36.

At still other times, when it is desirable to employ high cutting forces and low rotational spindle speeds, the pressure in the chamber 49 may be raised to such higher level that a higher maximum preload is impressed on the bearings 24,36.

When the maximum preload is to be placed on the bearings 24,36, sufficiently higher pressure is applied to deflect the web 47, thus thrusting the diaphragm body 42 and outer races 40 of the bearings 36 rearwardly, until the end face 42a of the hub 44 strikes the stop plate 53. The end face 42a is machined square with the spindle axis 11a, and at such contact, no additional preload will be seen by the bearings 24,36 as fluid pressure is increased. Fluid pressure may then be increased to a very high level to give a holding force which will be resistant to pull out forces which may occur at the cutting tool and tend to move the spindle to the left in FIG. 2 (i.e. in a forward direction). Thus, whereas the preload force in the chamber 49 would normally be the holding force level resisting spindle pull out, the holding force may be increased to an extremely high value, e.g. in the range of 10,000 to 15,000 pounds while maintaining a much lower preload in the bearings 24,36 because the body 42 has been driven solidly against the stop plate 53.

Figure 3:
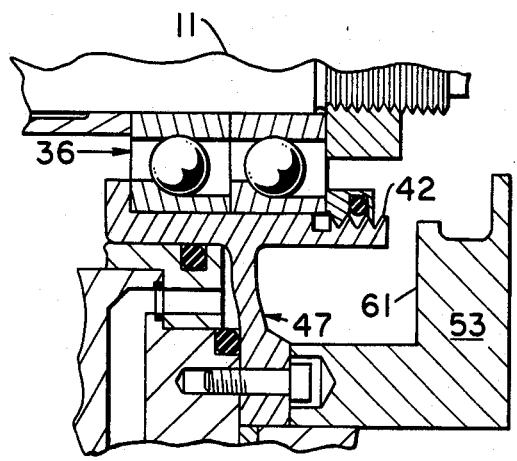
FIG. 3 is a diagrammatic view of the elements of FIG. 2 showing an assembly creating an initial, light bearing preload.

The diagrammatic view of FIG. 3 illustrates the deflected diaphragm web 47 at initial assembly, exerting a light initial preload on the bearings 24,36, and not utilizing hydraulic pressure to accomplish the initial preload. The gap between the diaphragm body 42 and stop surface 61 is greatly exaggerated for clarity.

Figure 4:
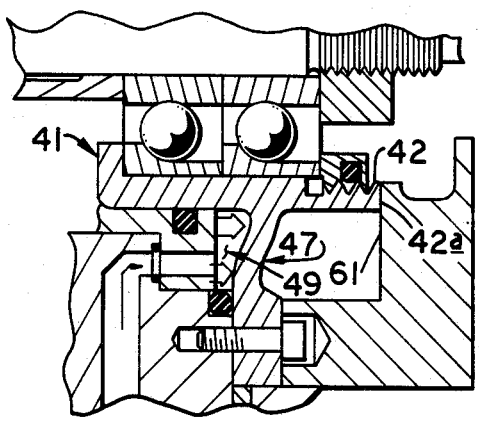
FIG. 4 is a diagrammatic view showing hydraulic pressure applied to obtain a bearing preload value and a relatively higher holding force clamping the bearing support against a housing stop element.

FIG. 4 illustrates the condition of maximum bearing design preload which is useful for performing heavy cutting operations at low spindle speeds. The body 42 of the diaphragm has been moved rearward into contact with the stop plate 53, so that the bearing spread experienced by the assembly will thus correspond to the maximum preload of the bearings 24,36. However, the pressure level in the chamber 49 has been raised to exert an extremely high axial force against the web 47 of the diaphragm 41, thus resulting in a large backup force to resist spindle pull out under forwardly directed forces applied at the spindle nose, while no further increase in bearing preload is caused by use of the large backup force. The attitude of the bearing 36 is maintained, i.e. the bearing is held square with the axis 11a, even though the spindle may experience radial loads and overturning moments. These loads and moments tend to cock the bearings 36, and may thus contribute to bearing failure.

The resistance to cocking tends to maintain the "roundness" of the bearings 36 under operating conditions.

Figure 5:
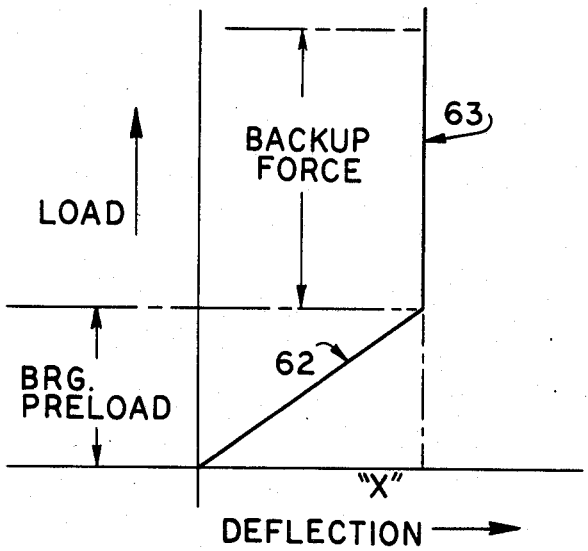
FIG. 5 is a graph of bearing preload and holding force versus spindle deformation.

The graph shown in FIG. 5 is illustrative of a plot approximating deflection along the X axis, (corresponding to stress in the spindle and directly corresponding to the amount of preload force in the bearing sets 24,36) versus load on the diaphragm 41. Here it can be seen that through the range of movement from initial preload until the stop plate 53 is encountered, the preload in the bearings 24,36 will be directly proportional, creating the angular ramp portion 62 of the graph. However, at dimension "X", corresponding to the position at which the stop plate is encountered, all further load impressed on the web 47 of the diaphragm 41 by increased hydraulic pressure will be seen only as a backup force portion 63 where the bearing package will be resistant to spindle pull out. The level of backup force may be increased substantially without further loading the bearings 24,36.

By the assembly shown, therefore, it can be seen that relatively safe operating loads can be desirably effected, in a predetermined fashion, to match the cutting loads expected at low and high rotational spindle speeds. The "backup", or "locking", force of the adjusted package at the rear bearing set may be effected at desired levels of force without changing the bearing preload.

Figure 6:
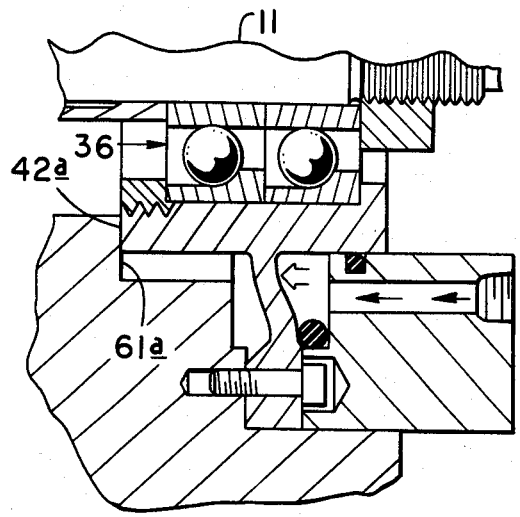
FIG. 6 is a diagrammatic view of an alternate embodiment, loading the rear spindle bearing in the opposite direction.

FIG. 6 depicts an alternate embodiment of the invention where the arrangement of the rear bearings 36 is reversed so that the assembly is preloaded from the rear. In this arrangement, the end face 42a of the hub 44 is driven in the forward direction, against an interior stop surface 61a machined in the housing flange 15. In all other respects, the embodiment operates as previously described.

It will be appreciated by those skilled in the art that, while the ring-like, end face 42a and stop surface 61,61a are shown continuous, they may be replaced with a finite plurality of cooperating end contact spots 61b to "square-up" the rear bearings 36.

Likewise, it will also be appreciated that the stop surfaces 61,61a, while shown in one position, may be formed on adjustably positionable stop elements 61a.

While the invention has been shown in connection with a preferred embodiment, it is not intended that the invention be so limited, but rather the invention extends to all such designs and modifications as come within the scope of the appended claims.

What is claimed is:

1. In a spindle support system, having first and second spaced-apart bearings carrying a rotatable spindle in a housing where said bearings are mounted in a predetermined squareness attitude with respect to said spindle and where said first bearing is axially fixed with respect to said spindle and housing, an improved device for effecting an axial load level between said bearings, comprising:

support means for permitting movement of said second bearing in an axial direction relative to said first bearing, between a first load level position and a second load level position;

stop means for positively limiting axial movement of said second bearing and for maintaining said attitude of said second bearing; and force means for powering said second bearing between said positions and for holding said second bearing in said attitude at a force load level greater than said second load level.

2. The device of claim 1, wherein said support means includes a flex member which is relatively stiff in a radial direction and relatively flexible in an axial direction.

3. The device of claim 2, wherein said flex member comprises a diaphragm, having an outer periphery affixed to said housing and an inner periphery affixed to said second bearing and having an axially-flexible web between said peripheries.

4. The device of claim 1, wherein said stop means includes adjustably positionable stop elements.

5. The device of claim 1, wherein said force means includes a fluid-operated expansible chamber element.

6. In a spindle support system having first and second spaced-apart anti-friction bearings carrying a rotatable spindle in a housing, where said bearings are mounted in a predetermined squareness attitude with respect to said spindle and where said first bearing is axially fixed with respect to said spindle and housing, an improved device for effecting an axial load level between said bearings, comprising:

an axially flexible diaphragm support member affixed about an outer periphery to said housing and affixed about an inner periphery to said second bearing, said second bearing movable in an axial direction relative to said first bearing;

a stop element affixed to said housing and including a stop face cooperating with said inner periphery of said diaphragm support member to limit axial movement of said second bearing and to maintain said attitude of said second bearing; and power means for flexing said diaphragm whereby said diaphragm may be selectively flexed to move said second bearing against said stop element to increase the bearing load level to a predetermined amount while providing a holding force exceeding the bearing load level and while maintaining said attitude of said second bearing.

7. The device of claim 6, wherein said power means for flexing said diaphragm comprises a sealed fluid chamber in said housing in fluid communication with said diaphragm and a source of fluid pressure, whereby said diaphragm is flexed under the influence of uniform pressure applied to its flexing face.

8. The device of claim 6, wherein said stop element and said diaphragm support member cooperate through a plurality of end contact spots.

* * * * *